No. 630,419. Patented Aug. 8, 1899.
C. P. STEINMETZ.
ALTERNATING CURRENT MOTOR.
(Application filed May 13, 1897.)
(No Model.) 2 Sheets—Sheet 1.
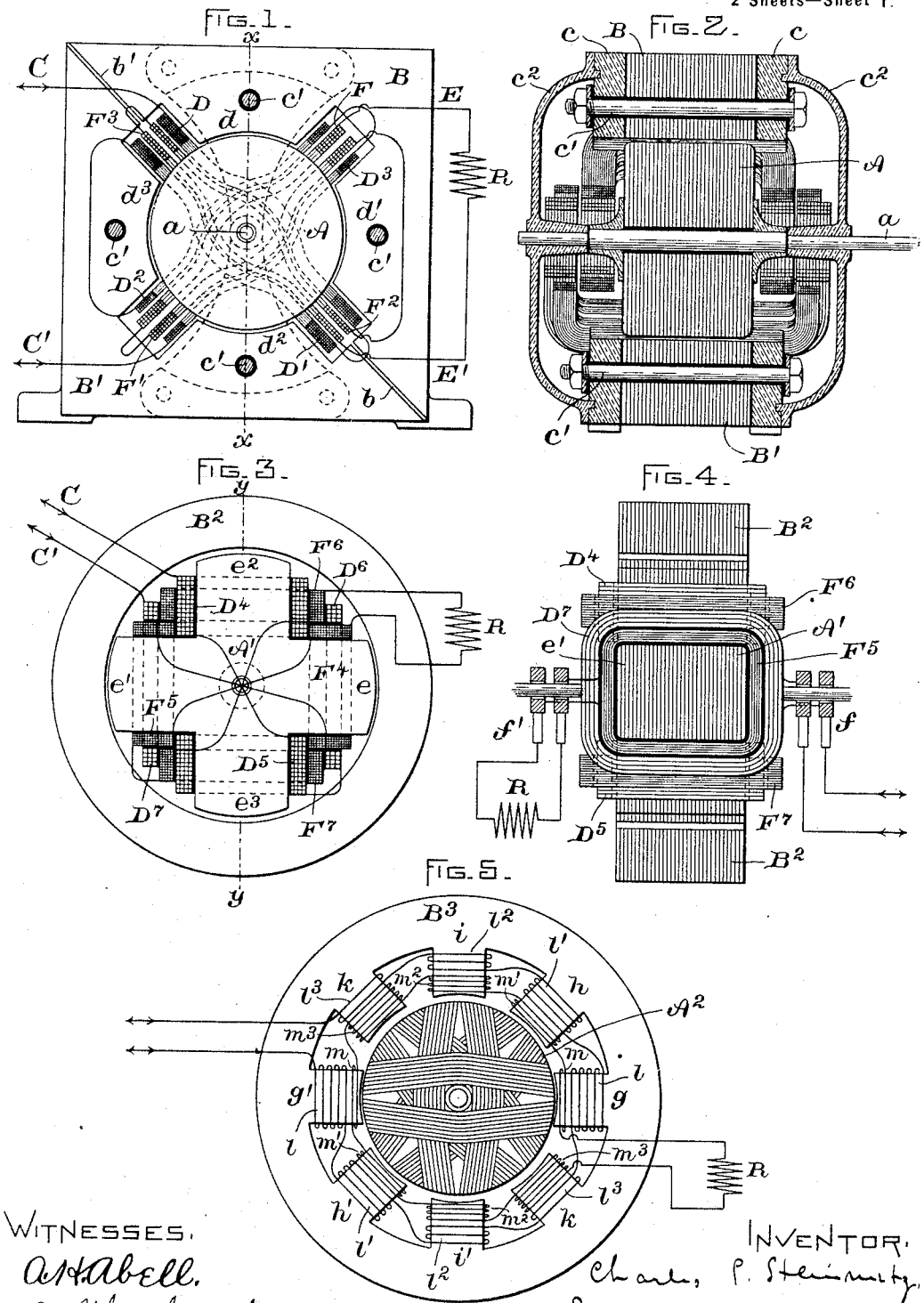
WITNESSES.
A H Abell.
A V Macdonald
INVENTOR.
Charles P. Steinmetz,
By Geo. R Blodgett
Atty.
THE NORRIS PETERS CO., PHOTO-LITHO., WASHINGTON, D. C.

No. 630,419. Patented Aug. 8, 1899.
C. P. STEINMETZ.
ALTERNATING CURRENT MOTOR.
(Application filed May 13, 1897.)
(No Model.) 2 Sheets—Sheet 2.
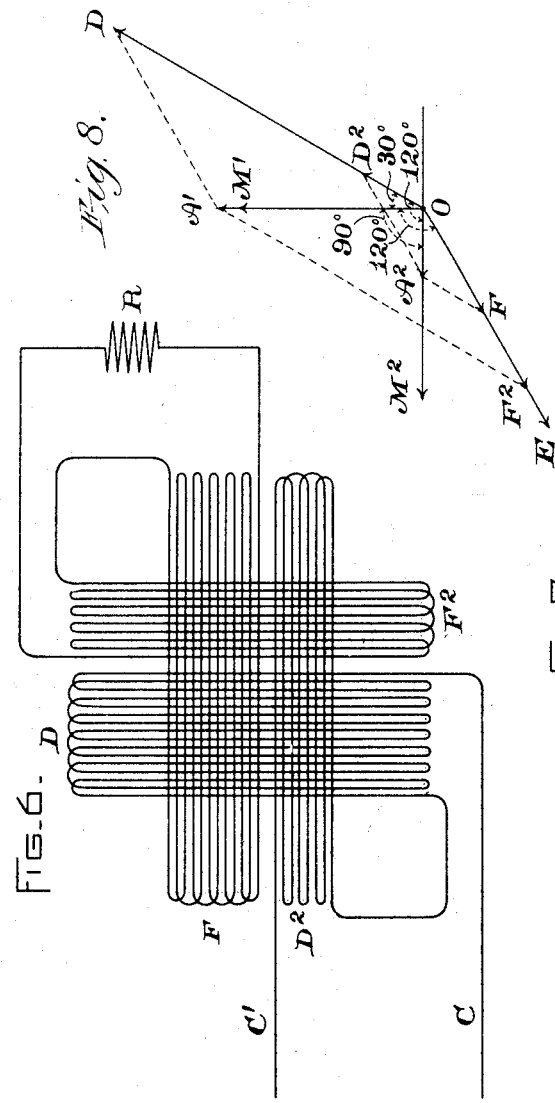
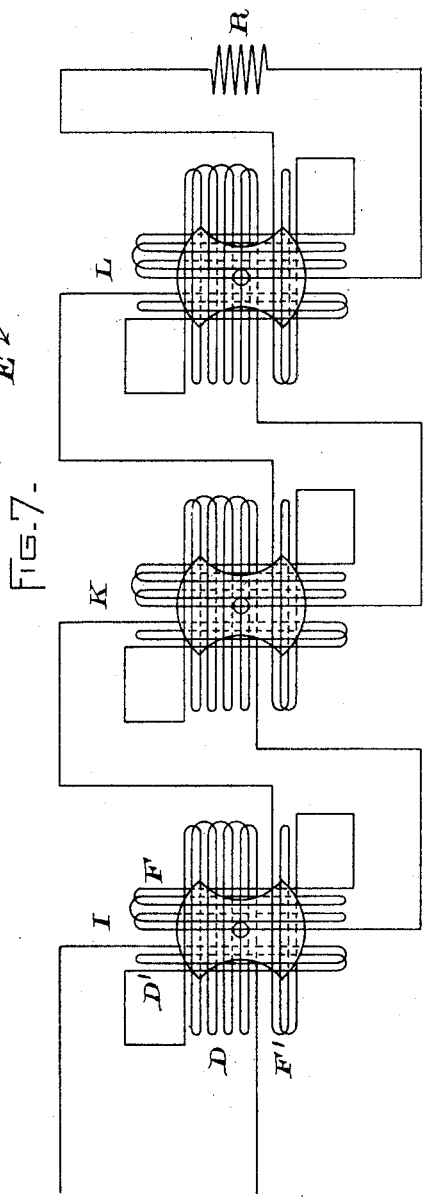
WITNESSES.
A. H. Abell.
A. F. Macdonald.
INVENTOR.
Charles P. Steinmetz
By Geo. R. Blodgett
Atty.

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

ALTERNATING-CURRENT MOTOR.

SPECIFICATION forming part of Letters Patent No. 630,419, dated August 8, 1899.

Original application filed August 31, 1891, Serial No. 404,265. Divided and this application filed May 13, 1897. Serial No. 636,281. (No model.)

*To all whom it may concern:*

Be it known that I, CHARLES P. STEINMETZ, a citizen of the United States, residing at Schenectady, county of Schenectady, State of New York, have invented certain new and useful Improvements in Alternating-Current Motors, of which the following is a specification.

The present application is a division of my application, Serial No. 404,265, filed August 31, 1891. In said original application certain generic features of invention are described as finding embodiments both in novel forms and arrangements of alternating-current electric motors and in stationary transformers and transformer systems. Said original application also described more specific features of invention, certain of which were applicable to motors, but not to transformers, while others, conversely, were applicable to transformers, but not to motors.

In this application the invention relates to certain improvements in the construction and use of alternating-current dynamo-electric machines and also to the connection of translating devices in tandem and will be readily understood by reference to the following description, taken in connection with the accompanying drawings, while its scope will be indicated in the appended claims.

Referring to the drawings, Figures 1 and 2 illustrate in two sections at right angles to one another an alternating-current motor designed to operate in accordance with the present invention and in which the armature is surrounded longitudinally by the field-coils. Fig. 2 is taken on the section-line $x\, x$, Fig. 1. Figs. 3 and 4 illustrate in two similar sectional views another form of alternating-current motor. Fig. 4 is taken on the section-line $y\, y$ of Fig. 3. Fig. 5 is an end view of an alternating-current motor in which the armature is surrounded by a field-magnet having multiple field-poles provided with a suitable arrangement of field-coils. Fig. 6 is a diagrammatic view of the winding of the field-coils of an alternating motor of the type herein described. Fig. 7 is a diagrammatic illustration of the invention as applied to a series of motors connected in tandem. Fig. 8 is an illustrative diagram, which will be referred to later on in describing certain of the electrical actions involved in the invention.

I will first describe the form of motor illustrated in Figs. 1 and 2. The armature A is in this machine the rotating element, and it may be widely varied in character. As here shown it comprises a cylindrical mass of laminated magnetic metal mounted upon a suitable shaft $a$, which may be provided with a pulley or other means for transmitting its rotative power. The iron forming the field-magnets of this machine consists of two laminated masses B B', separated from each other in a line parallel with the axis of the armature by spaces, as indicated at $b\, b'$. These masses of magnetic metal are supported in position by a suitable frame of non-magnetic material, (best seen in Fig. 2,) having end pieces $c\, c$, connected by cross-bolts $c'$, and brackets $c^2$, affording bearings for the armature-shaft. Each of these masses of iron affords appropriate concave cheek faces or poles $d\, d'$ and $d^2\, d^3$. The cheek-faces $d\, d'$ are separated by a rectangular recess for the reception of the sides of substantially rectangular field-coils, and the same is true of the faces $d^2\, d^3$; but the faces $d'$ and $d^2$ and $d^3$ and $d$ are not only separated by similar recesses, but also by the air-spaces $b\, b'$. Assuming now that these masses of metal have been magnetized, it will be seen that there are four coöperating magnetic circuits, to wit: the first from $d$ to $d'$ to the rear of the intervening recess and including an appropriate proportion of the magnetic metal of the armature A. In this circuit there is a minimum of magnetic resistance, the latter only resulting from the restricted annular air-spaces necessarily present between the cheek-faces and the armature; second, in the magnetic circuit from $d'$ to $d^2$ special magnetic resistance is afforded by the air-space $b$; third, from $d^2$ to $d^3$ there is a minimum resistance, as in the first circuit, and in the last or fourth circuit, from $d^3$ to $d$, there is the same special resistance as in the second circuit, because of the air-space $b'$. There is therefore in this machine a series of magnetic circuits, each one of which is between two magnetic circuits which have either a greater or lesser magnetic resistance than it.

The magnetization of the field metal depends upon the currents supplied to the coils, which, as already stated, longitudinally surround the armature A and have their sides within the recesses between the cheek-faces. These coils are clearly indicated in Figs. 1 and 2, and they are divided into two groups at right angles to each other. Although each group includes four coils considered as separate structures, there are, in substance, but two coils in each group, the separation of each coil into two parts being merely for securing their symmetrical distribution across the ends of the armature and with relation to the armature-shaft. Two of these coils in each group are in circuit with a source of alternating single-phase currents, which, for example, entering at C pass into one section of coils D and then directly to the other section D', thence around to a smaller coil $D^2$, to the second section of this coil $D^3$, and thence out at C'. The other two coils of each group are secondary coils in a closed circuit having a resistance therein, as at R, the connections being from R through E to the coil F, thence to coil F', thence around to coil $F^2$, thence to coil $F^3$, and by E' to resistance R.

The electrical organization of the field-coils is diagrammatically illustrated in Fig. 6, wherein the subdivision of the coils is not shown; but they are illustrated as divided into two groups of two coils each and arranged at right angles to one another. The alternating currents enter at C, traverse the large primary coil D, and thence through the small primary coil $D^2$ at right angles to D, and thence out at C'. The large secondary coil F is placed alongside of the small primary coil $D^2$ and the small secondary coil $F^2$ alongside the large primary coil D. The two secondary coils are in a closed circuit with the resistance R, as already described.

The current in coils D and $F^2$ tends to magnetize the armature in an axis at right angles from that of the coils F and $D^2$. Supplying alternating electric currents to the primary coils D and $D^2$ produces secondary currents in the coils F and $F^2$. The primary and secondary currents, as is well known, are dephased with respect to each other, and the strength of the secondary currents is regulated or determined by the resistance in the secondary circuit. For illustration I will assume that the secondary current in coils F $F^2$ will lag behind the primary or main current in coils D $D^2$ by one hundred and fifty degrees or, in other words, five-twelfths of a three-hundred-and-sixty-degree period. The magnetism in the two magnetic circuits will not follow or conform either to the primary or secondary currents; but it will follow or correspond with the resultant magnetomotive force of both currents, and therefore the maximum of magnetic phases will occur between the maximum electric phases of the two currents. In other words, the resultant magnetism will reach its maximum succeeding the maximum action of the primary current and preceding the maximum of the secondary current.

By giving the primary coil of one magnetic circuit more ampere turns, and hence more magnetizing power, than the secondary coil acting on the same magnetic circuit, and in the second circuit reversing the arrangement, so that the secondary coil has greater magnetizing power than the primary coil, the magnetism in the first-named circuit will more nearly coincide in phase with the primary current, and in the second circuit the magnetism will more nearly coincide in phase with the secondary current. Now on the assumption that the secondary current lags one hundred and fifty degrees or five-twelfths of a period behind the primary current the number of ampere turns in the different primary and secondary coils can be readily arranged so that the magnetic maximum in one circuit will occur one-fourth of a period after or before the maximum of magnetism in the other circuit. The two electromotive forces induced in the secondary coils F and $F^2$ will also differ correspondingly from each other in phase—that is, one-fourth of a period—and the said combined electromotive forces will yield a secondary current which lags behind the primary current five-twelfths of a period, as before stated.

To further illustrate, the large primary coil D in one magnetic circuit may have one hundred and fifty-six turns and the adjacent secondary coil $F^2$ may have ninety turns, and with the currents in both circuits of equal strength (as may be insured by a resistance in the closed circuit) the maximum of the resultant magnetism will occur one-twelfth of a period or thirty degrees after the primary current and four-twelfths of a period or one hundred and twenty degrees before the secondary current. Now in the other magnetic circuit the primary coil $D^2$ having thirty turns and the secondary coil F fifty-two turns the resultant magnetism in this circuit will occur four-twelfths of a period or one hundred and twenty degrees behind the primary current and one-twelfth of a period or thirty degrees before the secondary current, and therefore it will occur one-fourth of a period after the maximum of magnetism in the first circuit—that is to say, the magnetisms in the two circuits will differ by ninety degrees in phase. With these two circuits at right angles to each other and the primary coils fed with alternating single-phase currents the magnetic poles produced will be shifted correspondingly and make one revolution or rotation of the line of magnetization during each period of the alternating current. By providing in the first magnetic circuit D $F^2$ three times as much magnetic resistance as in the second magnetic circuit the magnetism afforded by the two circuits will be of equal strength, and the two electromotive forces induced in the secondary coils F and F² being proportioned to each other, as are the number of their turns, ninety to fifty-two, the secondary current lags behind the electromotive forces in F² by one-twelfth of a period or thirty degrees, and this last electromotive force being ninety degrees behind the magnetism of D the resulting magnetism of D F² lags behind the primary current thirty degrees and the secondary current lags behind the primary current one hundred and fifty degrees.

Reference is made to the diagram shown in Fig. 8 in order to further illustrate and explain the operation of the invention, and to make more clear the illustration discussed in the immediately preceding portions of this description. Assuming that the current in the secondary circuit lags one hundred and fifty degrees behind the primary current, then the line O D in the diagram may represent the primary current and the line O E the secondary current. The value of the secondary current can be made equal to that of the primary by a suitable adjustment of the resistance R in the secondary circuit. If the primary coil has one hundred and fifty-six turns in the first magnetic circuit, its magnetizing force can be thus represented in ampere turns by the line O D. The secondary coil in the first magnetic circuit is assumed to have ninety turns, and thus its magnetizing force can be represented in the diagram by the line O F², O D and O F² being proportioned, respectively, to one hundred and fifty-six and ninety. O D and O F² combine by the parallelogram of forces to a resultant magnetizing force O A′, which under the conditions assumed will lag thirty degrees behind O D and is one hundred and twenty degrees in advance of O F². The magnetism of the first magnetic circuit is produced by the resultant magnetizing force O A′, and thus can be represented by the line O M′ in phase with O A′, (if we neglect hysteresis and other secondary reactions.) In the second magnetic circuit the primary coil of thirty turns can be represented in magnetizing power by O D² and the secondary coil of fifty-two turns by O F, O D² and O F being again proportioned, respectively, to thirty and fifty-two. O D² and O F combine to a resultant magnetizing force of the second magnetizing circuit O A², which, with the numerical values assumed, is one-third as much as the resultant magnetizing force O A′ of the first magnetic circuit, and thus produces in the second magnetic circuit a magnetism O M² equal to that in the first-named circuit, since the magnetic resistance of the second magnetic circuit is one-third of that of the first magnetic circuit. The magnetism O M² of the second magnetic circuit is in phase with the resultant magnetizing force O A² of the second magnetic circuit, and thus, with the numerical values assumed, one hundred and twenty degrees behind O D² and thirty degrees in advance of O F. It is therefore apparent that O M² is ninety degrees behind O M′ or, in other words, that two equal magnetic fluxes, which may be represented by O M′ and O M², displaced from each other by ninety degrees difference of phase will be produced in the two magnetic circuits under the conditions assumed.

By the combined magnetizing influence of the single-phase alternating currents fed to the motor and the secondary currents induced as herein described and as represented in Figs. 1 and 2 an effective and highly satisfactory conversion of electrical energy into mechanical motion is accomplished. In this machine the number of ampere turns in the several coils are so proportioned and the variations of magnetic resistance are such that the magnetism produced by the coils in one circuit lags one-fourth of a period or ninety degrees behind the magnetism produced by the coils in the other circuit, and both magnetisms being of equal strength and perpendicular to each other cause a rotation of the two oppositely-induced poles of the armature at regular and uniform speed.

As before stated, the armature may be widely varied so long as it can be rotated by rotating magnetic poles in the field. It may be of solid iron or laminated against eddy-currents or laminated lengthwise, so that eddy-currents flowing therein will be of such direction relatively to the magnetizing force of the field-poles and of such difference in phase as to cause electrodynamic repulsion between the field and the armature. So, also, may be the H or shuttle core used, and this is especially desirable when a motor is to be operated synchronously. An armature with wire coils in closed circuits may also be used or a laminated-iron core coated with copper or tin for affording a special path for induced currents. So, also, may the exterior magnetic metal be widely varied in its form, arrangement, and distribution—as, for instance, as shown in Figs. 3 and 4, wherein the rotative element A′ is the field-magnet, and it is within a stationary iron ring B², which may be termed the "armature." The core of the magnet is composed of laminated iron so disposed as to afford four arms convex at their outer ends. Two of these, diametrically opposite, as at e and e′, have their convex faces closely adjacent to the coincident inner surface of the iron ring B², and the other two faces, e² and e³, are separated from said ring by wider spaces, thus affording variable magnetic resistance. Surrounding each of the arms e² and e³ there are large primary coils D⁴ D⁵, and around the arms e and e′ there are smaller primary coils D⁶ and D⁷, all of which are connected in circuit with the terminals C and C′, by which the alternating current is supplied by way of the brush-contacts f. Surrounding the arms e and e′ there are also large secondary coils F⁴ and F⁵, and around the arms e² and e³ there are other secondary coils F⁶ and F⁷, these all being in one closed circuit and including the resistance R, the latter being in connection by way of the brush-contacts at f'. In this machine, as in the one first described, one magnetic circuit is magnetized by the large primaries D¹ D⁵, in conjunction with the small secondaries F⁶ and F⁷, and the other magnetic circuit by the large secondaries F⁴ F⁵ and the small primaries D⁶ and D⁷, and their resultant operation is such that the magnet is caused to rotate with greater efficiency and at a speed corresponding with the speed of the alternations of the electric current supplied thereto. If, on the other hand, the magnet should be stationary and the ring B² provided with axial supports, then the line of magnetization would be rotated as before and the ring would become the rotative element.

In each of the two organizations thus far described the shifting phase is one-quarter of a period, or ninety degrees; but the shifting of phase in other proportions may be readily provided for—as, for instance, as illustrated in Fig. 5. In this organization the armature A² may be as before described; but as shown it has an iron core and a set of coils in closed circuit. The field metal B³ is an annular mass of iron with inwardly-projecting cores paired with each other on diametrical lines, as at $g$ $g'$, $h$ $h'$, $i$ $i'$, and $k$ $k'$. These cores have concave faces which are variably separated from the surface of the armature, the pair $g$ $g'$ having the least spaces, the pair $h$ $h'$ a little more, the pair $i$ $i'$ still more, and the pair $k$ $k'$ the greatest space, thus securing variable magnetic resistance in the magnetic circuits. The resistances of these different magnetic circuits are, as before in Figs. 1 and 2, proportioned relatively to the magnetomotive forces, so that displaced magnetisms of equal strength are maintained. Each of these cores carries a primary and secondary coil, and, as in the other machines, said coils are variably proportioned. The cores $g$ $g'$ have the largest primary coils $l$ and the smallest secondary coils $m$. The cores $h$ $h'$ have the next-smaller primary coils $l'$ and the next-larger secondary coils $m'$. The cores $i$ $i'$ have still smaller primary coils $l^2$, and their secondary coils $m^2$ are larger than on the cores $h$ $h'$. The cores $k$ $k'$ have the smallest primary coils $l^3$ and the largest secondary coils $m^3$. The primaries are connected in series and are fed by way of the terminals at C, and the secondaries are all in one closed circuit containing the resistance R. These four pairs of magnet-poles when excited by single-phase alternating currents afford shifting magnetic phases forty-five degrees displaced in phase. The magnetism of the circuits at $h$ $h'$ reaches its maximum, forty-five degrees, behind the magnetism at $g$ $g'$ and that at $i$ $i'$ reaches its maximum, forty-five degrees, behind $h$ $h'$, while at $k$ $k'$ it reaches its maximum, forty-five degrees, behind $i$ $i'$, and therefore the line of magnetic polarity is successively shifted at uniform speed from $g$ $g'$ over to $h$ $h'$, to $i$ $i'$, and then to $k$ $k'$ during each period of the alternating current. In this machine the magnetism in each magnetic circuit is induced and controlled, varied, or adjusted, as in the previous machines, by the two electric currents, whose magnetizing powers are variably proportioned relatively to each other, and the lag of the secondary current can be varied by variations of the resistance in the closed circuit. The electromotive force developed in the closed magnetizing-motor circuit may furnish current to a second motor or series of motors coupled in tandem, as shown in Fig. 7, the required resistance being in the closed circuit of the last motor of the series. In Fig. 7, showing this tandem coupling of motors, the first motor of the set is connected to a source of current. The secondary circuit of this motor instead of being closed through a resistance, as in Fig. 6, is connected to and supplies current to a second motor K, and to the second motor is connected in a similar manner a third motor L. The secondary circuit of the last motor contains the resistance R.

In these machines shuttle-armatures are indicated, and these are specially desirable for securing synchronous operation. In the motor I the primary coils D D' are arranged, as already described, and so are the secondary coils F F', the terminals of the latter connecting with the coils which serve as primaries in the motor K, and so on through motor L, and other motors may also be added in like manner.

What I claim as new, and desire to secure by Letters Patent of the United States, is—

1. In an alternating-current motor, the combination substantially as hereinbefore described, of a rotative element, and two groups of field-exciting coils at right angles to each other, inclosing the rotative element and affording separate magnetic circuits, each of said groups containing a primary coil and a secondary coil, the primary coils being of unequal magnetizing power, connected in series and adapted to be supplied with single-phase alternating currents, and the secondary coils, also of unequal magnetizing power, and in a closed circuit.

2. In an alternating-current motor, the combination substantially as hereinbefore described, of a rotative armature; masses of magnetic metal surrounding said armature, affording an appropriate set of cheek-faces, each included in two magnetic circuits, and having between appropriate cheek-faces open spaces for affording greater magnetic resistance in certain of the circuits than in the next adjacent magnetic circuit; and two groups of exciting-coils at right angles to each other, each group containing a primary coil, and a secondary coil, the primary coils in both groups being connected in series, and the secondary coils being connected in closed circuit.

3. The combination of two or more dynamo-electric machines in which rotation of the movable member is produced by the inductive action of primary alternating currents, and secondary currents induced therefrom in a secondary circuit, and means for coupling said machines in circuit tandemwise with the secondary circuit of one machine connected to the primary circuit of another machine.

4. The combination of two or more electric translating devices which comprise a primary conductor connected to a source of alternating electric currents, and a secondary conductor in which flow secondary currents induced by the primary currents and two or more magnetic circuits, each magnetic circuit being in inductive relation to both the primary and secondary circuits, and connections coupling such translating devices in tandem, the secondary of one of such devices being connected to the primary of the next, as set forth.

5. The combination of a source of alternating current, an alternating-current motor having inducing and induced windings and receiving energy from said source, and a second alternating-current motor fed with current derived from an induced winding on the first motor.

6. The method of producing mechanical power by alternating currents, which consists in inducing in a series of magnetic circuits magnetic waves by the magnetizing action of the alternating currents, modifying the phase of each of the magnetic waves by corrective magnetomotive forces so as to produce the phase displacement desired, inducing by said waves current in a relatively rotatable induced member, and reacting by the said current upon the magnetic waves to cause rotation.

7. In an alternating-current motor, the combination of a plurality of coils carrying alternating currents and acting on different magnetic circuits, and means for superposing upon each magnetic circuit a dephased magnetomotive force of such character that the resultant magnetic fluxes form an approximately correct rotary field.

8. In an electric motor, a plurality of magnetic circuits, each having a plurality of exciting-coils, and means for supplying the exciting-coils of each of said circuits with dephased currents, the coils being so proportioned that the fluxes in the magnetic circuits bear to each other a phase relation different from the phase relation of the exciting-currents.

9. In an alternating-current motor the combination of two coils set at angle to each other and carrying alternating currents, thereby giving rise to alternating magnetomotive forces and means for generating additional magnetomotive forces of such magnitude and phase as to cause the resultant magnetic fluxes to differ in phase approximately ninety degrees.

10. In an alternating-current electric motor, an inducing member provided with a plurality of magnetic circuits having energizing-coils carrying dephased currents, the magnetic circuits being of different magnetic resistance.

11. The method of producing a rotary magnetic field, which consists in setting up two magnetomotive forces having a definite phase difference, one of which is the resultant of two magnetomotive forces differing from each other by a certain angle, and the other of which is the resultant of two other magnetomotive forces differing from each other by the same angle but having a different ratio to each other.

12. The method of producing torque between the two relatively rotatable members of an alternating-current dynamo-electric machine which consists in causing a plurality of phase-displaced electric currents to flow in circuits in fixed relation to one member of the machine, producing two definitely phase-displaced magnetomotive forces each by the joint action of a plurality of said currents and submitting the other member of the machine to the influence of said magnetomotive forces.

13. The method of producing torque between the two relatively rotatable members of an alternating-current dynamo-electric machine which consists in causing a plurality of phase-differing alternating currents to flow in circuits in fixed relation to one member of the machine deriving from said currents a plurality of phase-differing magnetomotive forces each of which is out of phase with any one of said currents, and submitting the other member of the machine to the influence of said magnetomotive forces.

14. The method of producing a rotary magnetic field, which consists in setting up in two different circuits two electric currents one of which is derived directly from a source of energy, the other indirectly, and producing by the joint action of said currents a plurality of single-phase magnetomotive forces out of phase with each other, and each of which is out of phase with the current in any one of said circuits.

15. The method of producing a rotary magnetic field, which consists in setting up in two different circuits two electric currents one of which is derived inductively from the other, and producing by the joint action of said currents a plurality of single-phase magnetomotive forces out of phase with each other, and each of which is out of phase with the current in either of said circuits.

In witness whereof I have hereunto set my hand this 4th day of May, 1897.

CHARLES P. STEINMETZ.

Witnesses:
   B. B. HULL,
   M. H. EMERSON.